Oct. 26, 1965 E. D. MANNHERZ ETAL 3,213,685
MAGNETIC FLOWMETER
Filed Jan. 23, 1962 2 Sheets-Sheet 1
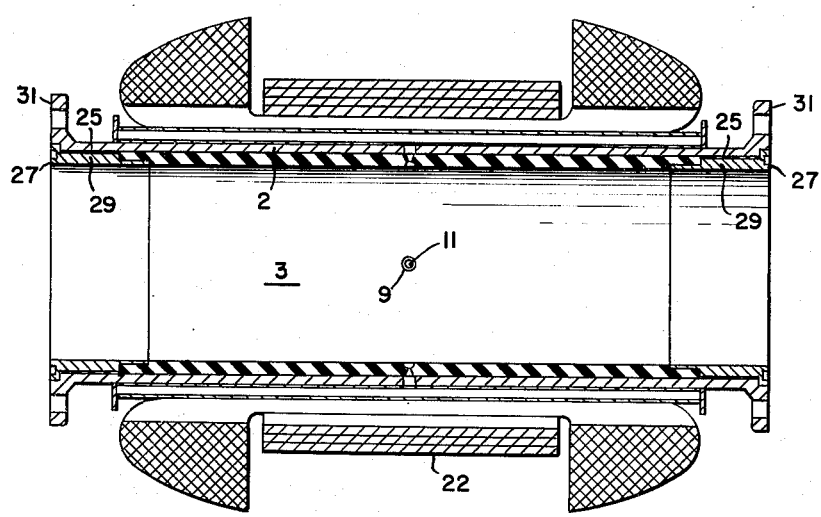
FIG. 1.
FIG. 2.
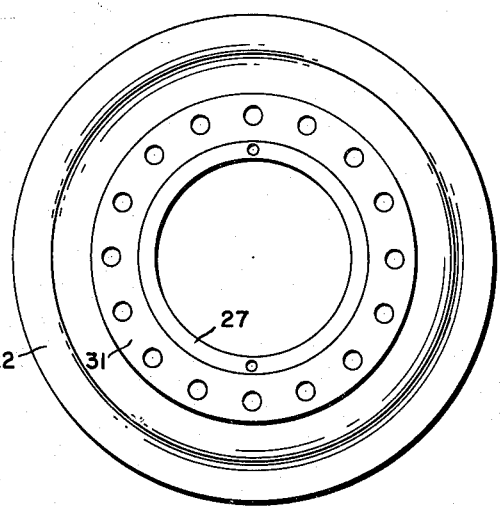
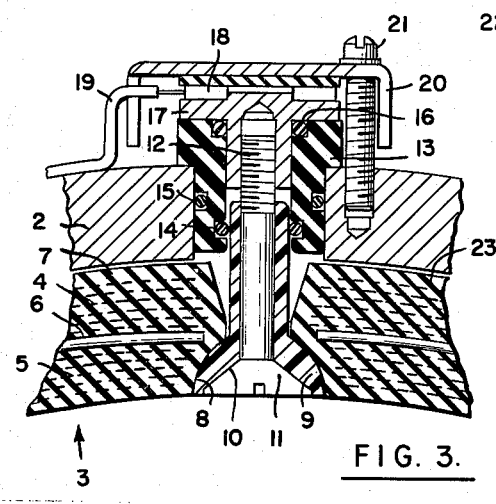
FIG. 3.
INVENTORS
ELMER D. MANNHERZ &
BY JOHN J. McDERMOTT
ATTORNEYS Oct. 26, 1965 — E. D. MANNHERZ ETAL — 3,213,685
MAGNETIC FLOWMETER
Filed Jan. 23, 1962 — 2 Sheets-Sheet 2

INVENTORS
ELMER D. MANNHERZ &
JOHN J. McDERMOTT
BY

ATTORNEYS

United States Patent Office 3,213,685
Patented Oct. 26, 1965

3,213,685
MAGNETIC FLOWMETER
Elmer D. Mannherz, Southampton, and John J. McDermott, Lansdale, Pa., assignors to Fischer & Porter Company, Warminster Pa., a corporation of Pennsylvania
Filed Jan. 23, 1962, Ser. No. 168,067
2 Claims. (Cl. 73—194)

This invention relates to magnetic flowmeters of the type in which a potential induced in a liquid flowing through a magnetic field is utilized as a measure of quantity of flow. The invention particularly relates to a flowmeter for the measurement of flow of abrasive materials such as are involved in dredging and bore hole drilling.

As is well known, the current or potential outputs produced in a flowmeter of the magnetic type are very small for ordinary flows to be measured. Currents are particularly small when the fluid which is being measured has a high resistivity. It is accordingly necessary to design a flowmeter in such fashion as to maximize the output, subject to such limitations as the strength of the magnetic field or other factors which are involved in the magnitude of the output. If a conductive conduit is used, uninsulated from the flowing liquid, and assuming electrodes presenting only small areas to the liquid, these being locally insulated from the conduit, it will be evident that the conductive conduit has a very substantial short-circuiting action, highly detrimental to the attainment of a satisfactory output. Accordingly, it has been customary to use in the past either conduits of insulating material or insulating linings within metal conduits. Conduits made entirely of insulating material are expensive if high pressures must be contained, and accordingly under high pressure conditions, as well as others, the choice has generally been in the direction of providing metal conduits lined with insulating material throughout such extended lengths as might be materially involved in the short-circuiting action.

The lining of a metal conduit with insulating material has various disadvantages among which is the difficulty of avoiding separation of the liner from the metal conduit due to temperature changes. Furthermore, if separation of the liner from the conduit occurs the liner is likely to be burst by high pressures in the flowing fluid. Some of the problems involved in the lining of metallic conduits may be solved in accordance with the disclosure of our application Serial No. 92,268, filed February 28, 1961.

The present invention relates to the same general problem, but particularly when there is involved the handling of abrasive materials requiring a liner which is sufficiently tough to resist wear. The most desirable liner for this purpose is of a soft rubber, most desirably a synthetic rubber such as neoprene, the liner being desirably reinforced in somewhat the same fashion as vehicle tires. Because of inevitable wear the liner must be replaceable, and it must be possible to effect replacement with ease, while at the same time reliably insuring that the eletcrical configuration is properly secured. In general, the replacement should involve only the transverse removal of the metering section of the conduit without disturbance of the connecting pipe.

It is accordingly the general object of the present invention to provide a flowmeter construction which satisfies the requirements indicated above. This general object as well as others relating to details of construction will become apparent from the following description, read in conjunction with the accompanying drawings, in which:

FIGURE 1 is an axial section taken through a magnetic flowmeter which includes matters of the present invention;

FIGURE 2 is an end elevation of the conduit assembly shown in FIGURE 1;

FIGURE 3 is a radial section showing particularly the details of assembly in the vicinity of an electrode.

Figure 4:
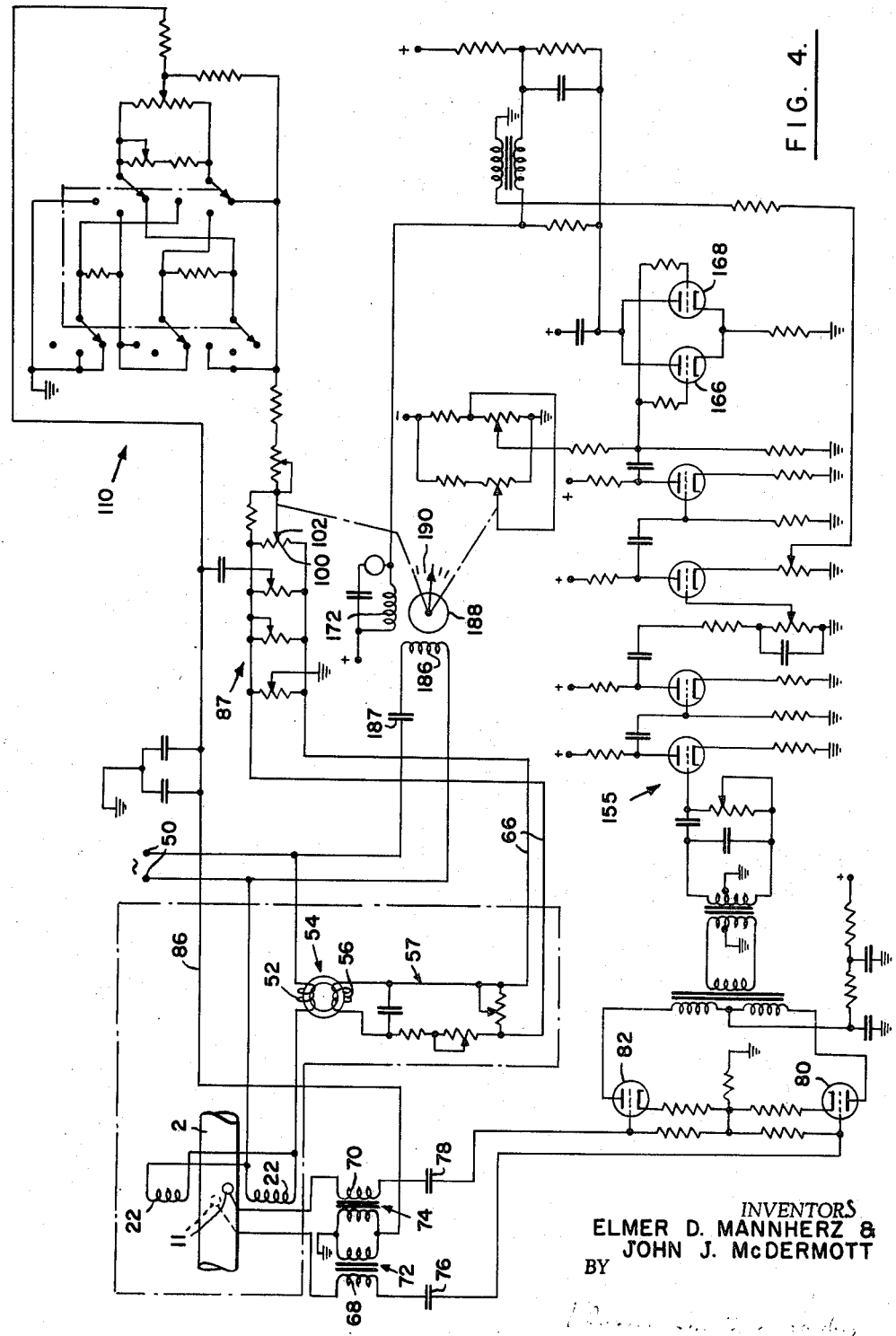
FIGURE 4 is a wiring diagram showing the electrical aspects of the flowmeter.

While a particular flowmeter is illustrated, and will be described herein, it will be evident that the invention may be applied to flowmeters having different constructions, and, in particular, different electrical systems for the measurement of the flow. To present a consistent picture, however, the disclosure, particularly in its electrical aspects, follows that of the application of Kass, Serial No. 768,595, filed October 21, 1958, now Patent Number 3,094,000. Reference may be made to that application for details.

The metallic conduit of the flowmeter is illustrated at 2 and is desirably formed at stainless steel or other non-magnetic material, such as aluminum or the like. Throughout the region where insulation is required there is located in the conduit 2 the liner 3 of reinforced rubber such as neoprene. As indicated in FIGURE 3, the reinforcement may comprise layers 4 and 5 of heavy fabrics, such as duck and a helix of reinforcing wire 6 of stainless steel or other non-magnetic metal. Since exposure of the duck to the flowing liquid must be avoided to prevent deterioration, and exposure of the wire helix must also be avoided to prevent interference with the proper electrical configuration, the rubber of the liner provides a sheath as indicated at 7 which completely surrounds these reinforcing devices and isolates them from the liquid. This isolation occurs both at the inside and the outside of the liner and also occurs in the region of passage of the electrodes as particularly illustrated in FIG. 3. The liner 3 has some flexibility but is substantially rigid to the extent that it alone cannot be depended on for tight sealing.

As is usual, a pair of electrodes are diametrically located opposite each other and are exposed for conductive contact with the flowing liquid, the diametrical center line of the electrodes being perpendicular to a transverse magnetic field threading the conduit and the flowing liquid. The insulating liner should have as its minimum length that sufficient to prevent appreciable short-circuiting of the liquid by the metal of the conduit, but in the present instance it is desirable, because of the desire for wear resistance, to have the liner extend axially to a much greater length on each side of the electrodes than is required for electrical considerations. Typical relative dimensions are as illustrated in FIGURE 1.

Referring particularly to FIGURE 3, the liner 3, in the vicinity of location of each electrode, is provided with a spherical socket 8 arranged to receive the correpondingly spherical head of an insulating tube 9 formed of a hard and rigid plastic. The inner end of this tube is provided with a conical sheet socket 10 to receive the correspondingly conical head of the electrode pin 11 which is threaded at 12. The head of the pin is desirably provided with a screw driver slot to facilitate removal and replacement. When the pin is properly seated in the conical socket the exposed portion of its head is substantially flush with the inner surface of the liner.

A headed sleeve 13 of rigid insulating material is received in an opening in the conduit 2 and is provided with internal and external grooves, as indicated, for the reception of sealing O-rings 14, 15 and 16. A headed nut 17 is internally threaded for engagement with the threads 12 of the pin 11, and as will be evident from FIGURE 3 this serves to hold the assembly together, and in particular secures the liner 3 to the conduit 2 at the location of each electrode.

The electrode and nut are desirably of stainless steel or other conductive metal, and electrical connections are completed by the location on the head of the nut of a bronze ring 18 which is soldered to the conductor of an insulated lead 19, there being one such lead for each electrode. A protective cap 20 of stainless steel or other non-magnetic metal encloses the outer portion of the assembly just described with the interposition of an insulating disc, the cap 20 being held in position by one or more screws as indicated at 21.

It will be noted that, as indicated at 23, the liner 3 may be spaced from the inner cylindrical surface of the conduit 2, but even if this spacing occurs, the liquid which may enter therein will engage only insulation about the conductive portions of the electrode assembly, the liquid being separated from these portions of the assembly by the tube 9 and the sleeve 13 in conjunction with the O-rings 14 and 15. So long as this separation is maintained, the electrical characteristics of the configuration are not disturbed. Actually, it is desirable that the liquid should be free to enter between the liner 3 and the conduit 2 to provide equalization of pressure and avoidance of possibly bursting stresses on the liner. As will immediately appears, no special care is taken to prevent free access of the liquid to this region.

Reference may now be made to FIGURES 1 and 2 for the desirable end arrangements associated with the liner 3. The liner is desirably reduced in thickness at its ends as indicated at 25 to receive internally cast iron or similar sleeves 27, the liner, for convenience, being desirably slotted at its ends to receive key portions 29 of these sleeves for the purpose of alignment during assembly. The sleeves 27 are for the purpose of holding the ends of the liner extended, the liner being sufficiently flexible as to possibly partially collapse and thereby possibly impede flow. The sleeves, however, are not relied upon to keep liquid from the space between the line and the conduit wall; in fact, as noted previously, access of liquid to this space is desirable for pressure equalization. The electrode assemblies provide the sole means for securing the liner to the conduit. The conduit 2 is provided with flanges 31 provided with holes for the reception of bolts to secure it between sections of piping serving for conduction of the liquid undergoing mesurement.

As will be evident from the foregoing, the construction not only provides the desired electrical configuration and the mechanical arrangement for proper operation, the liner extending the length of the conduit 2 to protect the same against abrasion, but the whole assembly is easily removable and replaceable, the electrode pins and their associated elements providing the sole fastenings for the liner except for those at its ends provided by the sleeves 27. By removing the electrode pins, the sleeves 27 and the liner may be axially removed and readily replaced.

For a full appreciation of the invention, there may now be described the associated matters which, as already noted, are set forth in detail in said Kass application. Windings 22 associated with an iron core structure provide a field which is at right angles to the diameter through the electrodes. The field thus produced may be direct or alternating, but an alternating magnetic field is most useful for securing best results, and it may be assumed for further description that alternating field excitation is used.

Referring now to FIGURE 4, alternating current is supplied from the terminals 50 connected to the usual power supply, for example at sixty cycles. The magnetic field windings 22 are connected in parallel and to the supply terminals. In series with the field windings there is the primary winding 52 of a toroidal transformer 54 the secondary winding 56 of which is connected to an adjusting network from which an output is taken through lines 66.

The leads from the electrodes 11 are connected individually through the secondaries 68 and 70 of identical transformers 72 and 74, and through the capacitors 76 and 78 to the grids of input triodes 80 and 82 forming part of an amplifier generally indicated at 155. The primaries of the transformers 72 and 74 are connected in parallel between ground and a line 86 in such fashion that signals fed back through the line 86 will null the signals from the electrodes, the connection being such that opposition to the electrode potential is provided by each transformer.

The line 86 receives current from the lines 66 previously mentioned through a network 87 and a range adjustment network 110. The network 87 comprises adjustments for centering, setting the input resistance, and for manual null control of quadrature signals. It also includes a potentiometer 100 provided with a contact 102 which is driven by a motor 188 to effect automatic balancing of the circuit and provide on a scale 190 a direct indication of flow.

The amplifier 155 terminates in a pair of power tubes 166 and 168 operating as a class C stage. This stage supplies current to the field winding 172 of the motor 188, the other field winding 186 of this motor being provided with current from the terminals 50 through the phase adjusting capacitor 187.

The operation of the measuring system is described in detail in said Kass application, and since the details of operation are not of special significance in connection with the present invention it will suffice to point out that when the circuit in FIGURE 4 is not balanced, inputs are provided to the triodes 80 and 82 and, through the amplifier 155, the motor 188 is operated in one direction or the other, as required to attain balance, with resulting provision of a signal through connection 86 to balance the circuit, i.e., to provide zero in-phase signals to the triodes 80 and 82. When balance has been thus achieved (through adjustment of contact 102 of potentiometer 100) the flow may be directly read on the scale 190.

It will be evident that other indicating or recording devices may be used, with full achievement of the advantageous results of the invention. It will also be clear that various details of construction may be changed without departing from the scope of the invention as defined in the following claims.

What is claimed is:

1. A flowmeter comprising an electrically conductive conduit for flowing liquid having an uninsulated inner surface, electromagnetic means providing a magnetic field transverse to said conduit, means supplying current to said electromagnetic means, electrodes insulated from, and extending through openings in, said conduit, exposed to liquid flowing through said conduit, and located on a line extending transversely through said field to pick up signals generated by flow of liquid through said field, means connected to said electrodes for measuring said signals, insulating liner means within said conduit, said liner means being formed of fabric laminations impregnated with an insulating plastic material and provided with openings at the locations of said electrodes with the openings providing inwardly directed sockets, substantially rigid insulating sleeves receivable in said openings and having enlarged head portions fitting said sockets, the openings in said sleeves also having sockets and said electrodes being in the form of threaded pins provided with heads fitting the last mentioned sockets, and clamping means including members threaded to the electrode pins and means insulating the electrode pins and said members from said conduit and sealing the electrode pins against access thereto of liquid between said conduit and said liner means, said insulating means including O-rings sealing the assembly against liquid flow, the electrode pins, the sleeves and the clamping means constituting the sole means securing the liner means to the conduit, the liner means being otherwise free to move relatively to the conduit.

2. A flowmeter comprising an electrically conductive conduit for flowing liquid having an uninsulated inner surface, electromagnetic means providing a magnetic field transverse to said conduit, means supplying current to said electromagnetic means, electrodes insulated from, and extending through openings in, said conduit, exposed to liquid flowing through said conduit, and located on a line extending transversely through said field to pick up signals generated by flow of liquid through said field, means connected to said electrodes for measuring said signals, an elongated cylindrical insulating liner within said conduit, said liner being provided with openings in its central portion at the locations of said electrodes, said electrodes being in the form of pins extending through said openings, means associated with said electrode pins to clamp said liner to the conduit, the electrode pins and the last mentioned means constituting the sole means securing the liner to the conduit, the liner being otherwise free to move relatively to the conduit, and rigid members within the ends of said liner to maintain said ends extended and adjacent to the inner wall of the conduit.

References Cited by the Examiner

UNITED STATES PATENTS

| | | | |
|---|---|---|---|
| 590,811 | 9/97 | Storrow | 285—55 |
| 1,949,984 | 3/34 | Walker | 285—55 |
| 2,422,379 | 6/47 | Westman | 174—152 |
| 2,800,016 | 7/57 | Sturgeon | 174—152 X |
| 2,932,597 | 4/60 | St. John et al. | 138—141 X |
| 2,949,551 | 8/60 | Sturgeon | 73—194 |
| 2,969,673 | 1/61 | Snyder et al. | 73—194 |
| 2,974,684 | 3/61 | Ginaven et al. | 138—141 X |

FOREIGN PATENTS 1,068,068   10/59   Germany.

RICHARD C. QUEISSER, *Primary Examiner*.

DAVID SCHONBERG, *Examiner*.